United States Patent [19]

Lott et al.

[11] Patent Number: 4,818,398

[45] Date of Patent: Apr. 4, 1989

[54] FILTER SYSTEM WITH READILY REPLACEABLE FILTER ELEMENT

[76] Inventors: W. Gerald Lott, 707 Lehman, Houston, Tex. 77018; Glen E. Grant, 2911 Beverly St., Pasadena, Tex. 77503

[21] Appl. No.: 135,389

[22] Filed: Dec. 21, 1987

[51] Int. Cl.$^4$ .................. B01D 35/14; B01D 35/30
[52] U.S. Cl. ..................... 210/238; 210/287; 210/448; 210/450; 210/452; 210/493.5; 55/493
[58] Field of Search ............. 210/232, 236, 237, 238, 210/249, 287, 445, 448, 450, 451, 452, 453, 493.1, 493.5; 55/498, 500, 493

[56] References Cited

U.S. PATENT DOCUMENTS

| | | | |
|---|---|---|---|
| 2,709,524 | 5/1955 | Russell et al. | 210/238 |
| 3,147,220 | 9/1964 | Avery | 210/445 |
| 3,398,835 | 8/1968 | Offer | 210/452 |
| 3,615,018 | 10/1971 | Johnson | 210/232 |
| 3,897,342 | 7/1975 | Schmid et al. | 210/445 |
| 4,126,559 | 11/1978 | Cooper | 210/445 |
| 4,231,872 | 11/1980 | Keil | 210/232 |
| 4,283,281 | 8/1981 | Cogan | 210/453 |
| 4,390,425 | 6/1983 | Tafara et al. | 210/232 |
| 4,496,459 | 1/1985 | Rosaen | 210/232 |
| 4,701,259 | 10/1987 | Rosaen | 210/452 |

Primary Examiner—Richard V. Fisher
Assistant Examiner—Wanda L. Millard
Attorney, Agent, or Firm—J. Peppers

[57] ABSTRACT

A filter system including an elongated cylindrical vessel body having a flow inlet connected to inlet conduit, a flow outlet connected to an outlet conduit, a closed end, and a movable cover member. The conduits are adapted for respective connection to control valves. A hinge connects the cover member to the vessel body for pivoting the cover member from closed position to open position. A solids separator element disposed within the body has a hollow porous member attached about periphery of a support ring. The support ring has an annular flat surface abutting an annular flat surface of the support flange. An arcuate resilient spring is connected to opposite sides of the support ring and extends to be forcefully deformed against the inner side of the cover member when cover member is closed.

15 Claims, 2 Drawing Sheets

FILTER SYSTEM WITH READILY REPLACEABLE FILTER ELEMENT

FIELD OF THE INVENTION

This invention generally relates to liquid-solids separation apparatus, and more particularly pertains to a filter system including a vessel capable of withstanding high working pressures and having a removable cover adapted for quick opening and closing of the vessel as needed to replace a quickly replaceable filter bag contained within the vessel.

BACKGROUND OF THE INVENTION

This invention is in improvement to filtering devices of the type disclosed in Rosaen U.S. Pat. No. 4,419,240. Such liquid solid separators of the strainer and/or filter bag type are in prevalent use throughout industry. The present invention was conceived and developed for use to separate sand and finer particulates from the water which is injected into oil bearing earth formations to displace the oil occurring in these formations over to adjacent well bores where it can be produced for marketing. This displacement process is commonly referred to as "water flooding" and is used extensively in oil fields for the secondary recovery of oil.

Such liquid solids separators are additionally used to separate particulates from liquid petroleum products such as glycol, lube oil, fuel gas, amine, and in other petroleum and chemical process applications. The pressure vessels and piping utilized in such filter or screening systems are designed for exemplary working pressures of from around 100 psi to as much as 5,000 psi, as determined by the ASME Code and similar codes.

Various kinds of bags, screens and "cartridges" are employed in these systems to trap the particulates from the liquids passing through the systems. The solids separator elements are designed for liquid flow rates from 1 gpm to 250 gpm, as examples. The solids filter elements also incorporate design that permits pressure differentials across the separator element of from about 1 psi up to about 50 psi before the solids separation element needs to be changed for a clean replacement element.

Various manufacturers supply these liquid solids separators with examples being: Flo-Trend, Inc., Houston, Tex.; Nowata Filtration, Nowata, Okla.; Filter Specialists, Inc., Michigan City, Id.; Ronninggen-Petter Corporation, Portage, Mich.; Rosedale Products, Inc., Ann Arbor, Mich.; WM. W. Nugent & Co., Illinois; American Felt and Filter Company, Newburgh, N. Y.; and FloTech Fluid Handling, Ltd., in Germany.

Features of the present invention are similar to those disclosed in the following presently know U. S. Patents: U.S. Pat. No. Re. 26,127 to Wade; U.S. Pat. No. 1,482,048 to Swanson; U.S. Pat. No. 2,655,397 to Augspurger, et at; U.S. Pat. No. 3,246,793 to Wade; U.S. Pat. No. 3,720,322 to Harms; U.S. Pat. No. 4,129,151 to Henson; U.S. Pat. No. 4,267,940 to Wade; and U.S. Pat. No. 4,419,240 to Rosaen.

OBJECTS OF THE INVENTION

An object of the present invention is to provide a solids separation apparatus wherein the solids separation element may be replaced with a minimal time for the system to be out of service.

Another object of the present invention is to provide solids separation apparatus wherein an initial flow seal is mechanically provided to block any by-pass of fluids through the solids separation element as occurs in prior art systems where flow has to be initiated to create needed pressure differential across the separations element to establish such a seal.

A further object of the present invention is to integrate the closure and latching mechanism with the vessel cover and thereby to substantially shorten the time required to unlatch, open, close and relatch the cover when replacing a filter bag element.

SUMMARY OF THE INVENTION

The foregoing and other objects and advantages of the invention are attained through provision of an elongated solids separation system having inlet and outlet conduits adapted to be closed by valves and including a vessel body having a flow inlet, a flow outlet, a closed end, an open end, a fixed closure flange defined about the periphery of the open end, and a support flange defined about the inner wall of said body between said inlet and said outlet and having a flat surface facing the inlet. A moveable cover member having amovable closure flange is provided to fit the fixed closure flange. A hinge connects the cover member to the vessel body for pivoting the cover member from a closed position to an open position. The closure flange and the cover flange each define flat surfaces on one side and chamfered bevels on the other side to form a V-shaped section of external profile when the flat surfaces are placed in abutment. One of the flange surfaces forms a peripheral groove containing an O-ring to effect a fluid type seal when the flat surfaces are constrained together. A constraining ring hinged into sections defines a V-shaped section of internal profile about its inner periphery which is adapted to be cammed closely about the V-shaped external profile of the flanges and is adapted to be pivoted from a closed to a retracted and open position. A toggle latching means connects to latch the ring into a forceful camming relationship around the flanges when toggled to a closed position and into a position releasing the flanges when toggled to an open position. An elongated solids separator element member, which is disposed within the vessel body, has an elongated hollow permeable member attached about the periphery of a support ring. The surface of the butting support flange with the support ring has a flat surface abutting the surface of the support flange. A peripheral groove may be defined in the flat surface of one of the support ring or the support flange to contain an O-ring to further a fluid tight seal therebetween. An resilient support spring having the looped configuration of a bail is connected to opposite sides of the support ring and extendss to be resiliently flexed and deformed against the inner side of the cover member when the cover member is in closed position.

DESCRIPTION OF A PREFERRED EMBODIMENT

Figures 1, 2:
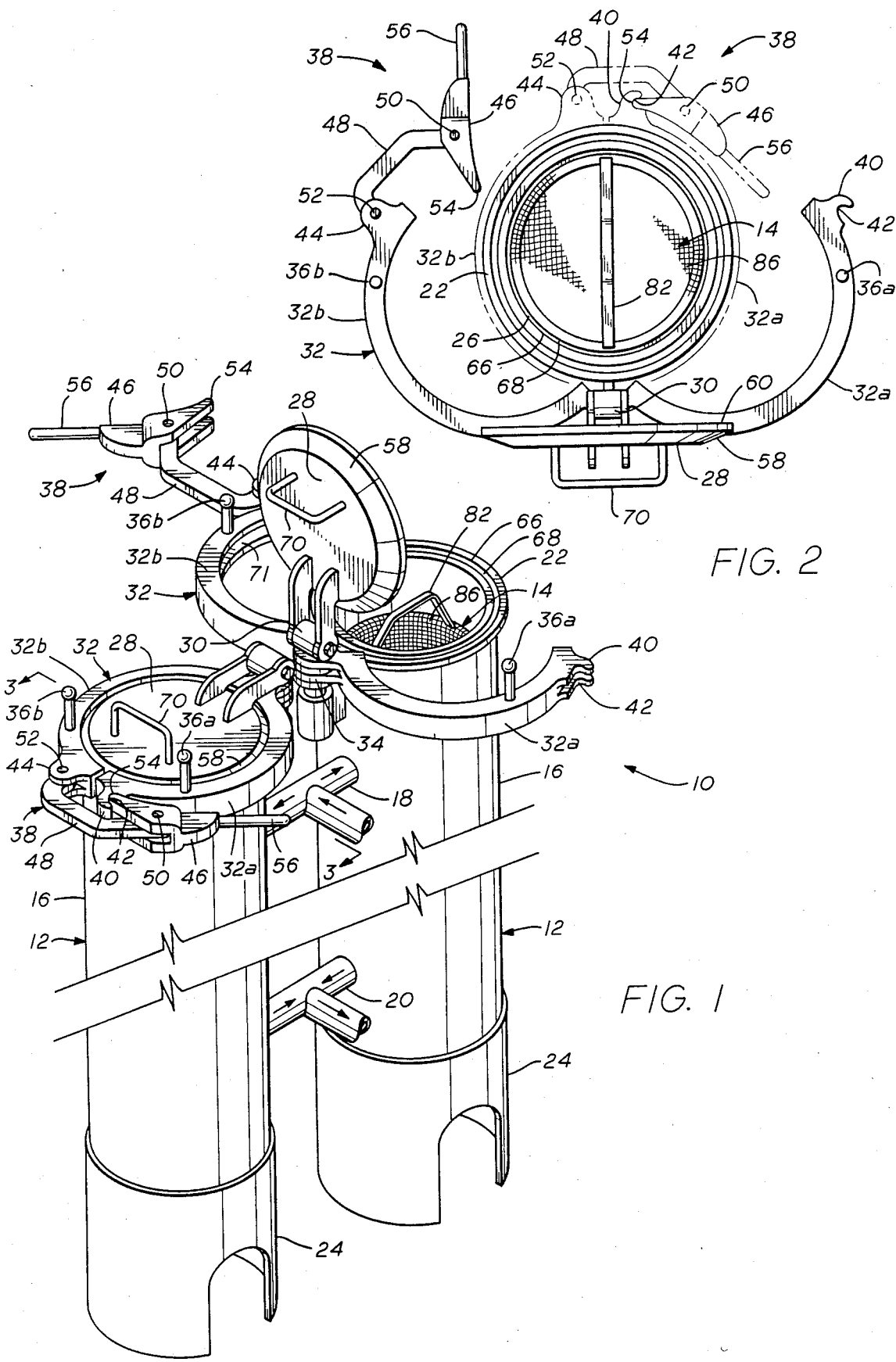
FIG. 1 is a perspective view of the liquid solids separator of the present invention as may be employed in multiples for oil field use.
FIG. 2 is a plan view looking down on one of the separators shown in FIG. 1.
Figure 3:
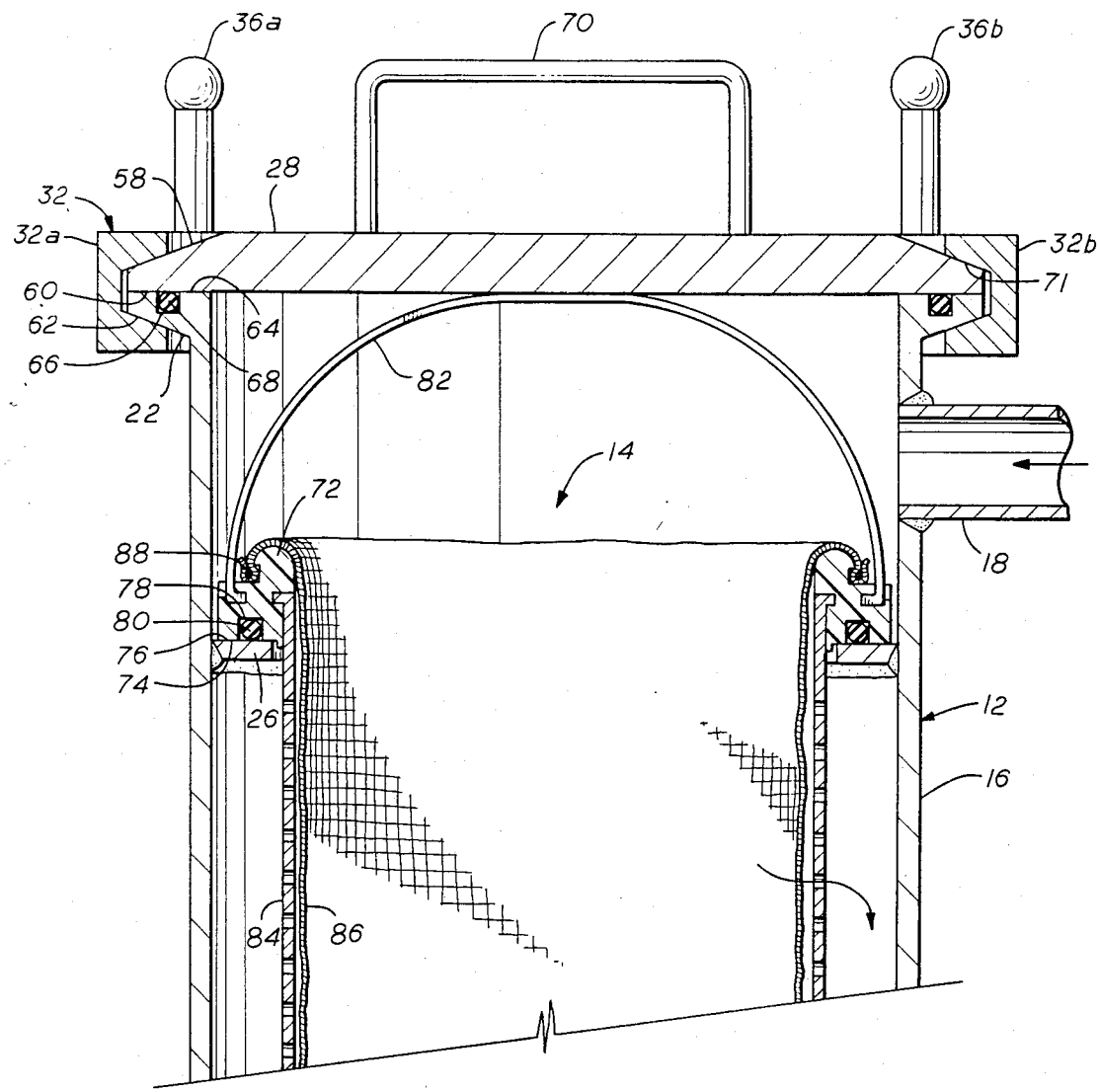
FIG. 3 is a partial sectional view of the separator as taken along the line 3—3 in FIG. 1.

Referring first to FIGS. 1 and 3, there is shown an assembled liquids solids separator system 10 which includes a pair of liquid solids separators or filter bag vessels 12 of the present invention. The vessel 12 houses a regularly removed and exchanged (or cleaned) solids separator element 14 within a vessel body 16. The element 16 is termed a filter bag or filter bag assembly as later described. The vessel body 16 incorporates an upper flow inlet 18, a lower flow outlet 20, an upper open end incorporating a fixed closure flange 22 and an lower closed end (not shown) to which a support skirt 24 is attached.

Disposed between the inlet 18 and outlet 20 is a support flange 26 (shown in FIG. 3).

A removable cover member 28 is attached to the vessel body 16 by means of a hinge assembly 30 which permits the cover 28 to be moved from a closed position in abutment with closure flange 22, as shown in FIGS. 1 and 3, to a vertical open position as shown in FIGS. 1 and 2. A hinged constraining ring 32 comprising sections 32a and 32b are also supported in hinged relation by hinge assembly 30 which includes a hinge 34 to pivot the sections 32a and 32b into the open position shown in FIGS. 1. The ring sections 32a and 32b have handles 36a and 36b for manual closing of the ring sections 32a and 32b as later described.

A toggle closure mechanism 38 is provided to positively connect the rings 32a and 32b into closed position and thereby to closely constrain the movable cover 28 into closed position. The closure mechanism 38 is best shown assembled by ghosted lines in FIG. 2 and is comprised of the following elements.

Stud lugs 40 defining a pvot recess 42 is formed at the end of ring section 32a. Formed at the end of the ring section 32b is a pintle lug 44. A toggle member 46 is attached to a toggle draw link 48 by means of a pintle pin 50. The other end of the draw link 48 is connected to the pintle lug 44 by a pintle pin 52. The toggle member 46 defines a toggle nose 54 at one end and a toggle handle 56 at its other end.

As the toggle closure mechanism 38 is used, the ring sections 32a and 32b are first drawn into closed position as shown by ghosted lines in FIG. 2., the toggle member nose 54 is manually placed into the pivot recess 42. Manual force is exerted on the toggle handle 56 to pull toggle member 46 around so as to pivot the toggle nose 54 about in the pivot recess 42 and thereby draw the ring sections 32a and 32b into forceable constraint through the draw link 48. As the toggle member 46 is pivoted about, it is pulled to past the line between the toggle link pintle pins 50 and 52, which serves to latch the mechanism into closed position shown by ghost lines in FIG. 2 and at the left of FIG. 1. This ring section design is capable of containing fluid pressures far above conventional bolted arrangements.

FIG. 3 best illustrates the construction of the filter bag assembly 14, the closure flange 22, the support flange 26, and the moveable cover member 28, all when closed and in liquid filtering mode.

The cover 28 has defined about its outer periphery a chamfered bevel 58 on its upper side and a flat surface 60 on its lower side. The closure flange 22 has defined about its periphery on its lower side a chamfered bevel 62 and on its upper side a flat surface 64. When the cover member 28 is disposed in closed position as shown in FIG. 3, the included angle of the bevels 58 and 62 may be 60°, for example, to form a V-section in profile as shown in FIG. 3.

The flat surface 64 of the flange 22 forms a seal groove 66 in which an O-ring seal 68 is combined as shown to function appropriately as a fluid seal while the cover surface 60 is constrained against the flange surface 64.

As also shown in FIG. 3, the cover 28 is equipped with a cover handle 70.

Defined about the inner periphery of the constraiing ring sections 32a and 32b is a V-shaped groove or notch 71 which is provided to match the V-shape of the bevels 58 and 62. When closure force is applied to the ring sections 32a and 32b by the closure mechanism 38 as shown in FIG. 2, the corresponding V-sections as above described operate with a camming action to urge the flat surfaces 60 and 64 together into very forceful constraining relationship.

The seal and closure of cover member 28 to the closure flange 22 as above described has the capability to withstand any of the high operating pressures as previously described. When constructed under certain codes as previously mentioned, however, this kind of closure is limited to prescribed operating pressures with prescribed diameters of the vessel body 16 and the cover member 28.

As seen in FIG. 3, the filter bag assembly 14 has a carrier ring 72 which has a lower flat surface 74 which is adapted to abut an upper flat surface 74 of support flange 26. A seal groove 78 may be formed in the lower flat surface 74 of carrier ring 72 to receive an O-ring seal 80.

A resilient spring 82, formed as an arcuate bail, is rigidly connected to opposite sides of the carrier ring 72. Spring 82 extends upwardly into forceful relationship against the inner surface of cover member 28 to the extent that the spring 82 resiliently yields or flexes to transmit force downwardly through the carrier ring 72 to between the abutting surfaces 74 and 76. This spring action assures an initial sealing action between abutting surfaces which may be supplementedly by the O-ring 80. This sealing action is further assured later by the differential pressure drop between the inlet 18 and outlet 20 as provided by the flow resistance of the filter bag assembly 14 during operation of the system.

Connected about the inner periphery of the carrier ring 72 is a bucket shaped screen member 84 having a closed bottom end (not shown). The screen 84 may be formed of perforated sheet metal as shown in the drawing and also may be formed of woven mesh screen (not shown). The function of the screen 84 in the installation as shown is to provide full and even support to a filter bag 86 which is confined within the screen 84 and attached at its upper periphery to the periphery of the carrier ring 72 as shown by means of a wire 88, for example. The bag 86 has also a closed lower end (also not shown) and may be formed of various flexible woven fabrics and of various selected porosities. The filter bags 86 may be formed alternately of felt or paper elements, for example. Such filter elements may also be formed as cartridges of pleated materials to give a greater surface area of flow through the filter element. Stacked type disc filter elements may also be employed with slight modification of connection to carrier ring 72 as shown.

As may be desirable, the bags may be filled with filter media such as Fuller's Earth which is evenly packed into the bag (not shown).

In some applications, the basket comprising only the screen member 84 may be used with various mesh or perforations per inch. The above manufacturers provide such filter screens.

In operation, the filter bag assembly 14 is disposed as shown in FIGS. 1 and 3 and liquid is pumped in through the flow inlet 18 through the bag 86 and out the fluid outlet 20. The liquid flow creates a differential pressure across the bag assmebly, including the carrier ring 72, and thereby increases the seal initiated by the abutting surfaces 74 and 76 and the O-ring 80 responsible to the forceful urging of the spring 82. The further sealing force is proportional to the differential pressure across the device created by the rate of flow through the device and the amount of plugging of the filter bag asssembly with accumulated particulates.

At such time as the differential pressure increases to a prescribed limit, for example 40 PSI, the filter element 14 is removed and replaced by a new filter element with the differential pressure thus being reduced to 2 PSI, for example.

To change the filter bag assembly 14, pressure is first removed as by closing valves (not shown) connected to inlet 18 and to outlet 20. The toggle handle 56 is pulled past the line between pintle pins 50 and 52 which releases the force of closure applied to the constraining rings sections 32a and 32b. The camming action previously referred to forcefully close the cover 28 against the flange 22 then serves the help release the ring sections from the bevels 58 and 62.

The ring retraction hinge 34 them permits the ring section 32a and 32b to be pivoted away from the cover member 28 to retract the ring sections. The cover 28 may then be opened slightly in response from force applied from below by the resilient spring 82.

The cover 28 is fully opened and the filter bag assembly 14 lifted out of the bag vessel 12 by means of the bail spring 82. It is to be noted that filter cake or sand is usually all about when the assembly 14 needs to be removed. The structure of abutting members 26 and 72 serves to avoid the sticking and hanging between concentrically fitted members as caused by the filter cake. A typical example is shown by the concentrically fitted members 47 and 24, 25 of U.S. Pat. No. 4,419,240.

A new bag assembly 14 is lowered into position with the flat surfaces 74 and 76 coming into sealing abutment. The cover 28 is next lowered into closed position. The ring sections 32a and 32b are pulled into closed position and latched into place with a pull on the toggle handle 56 to bring the toggle mechanism 38 into closed position as shown in FIG. 2.

The camming action of the ring grooves against the bevels pulls the lid or cover 28 into fully closed position with the resiilent spring 82 being placed into compression as shown in FIG. 3 to hold down the separator element 14 and thereby to initiate the seal created by the abutting surfaces 74 and 76 as supplemented by O-ring 80.

The complete replacement of separator element 14 can be accomplished in a matter of seconds when the time involved is of importance (much quicker than accomplished with prior art devices.).

The operating pressure is restored to the vessel 12 and flow is resumed through the vessel from the flow inlet 18 through the filter assembly 14 and out of the lower flow outlet 20.

Figure 4:
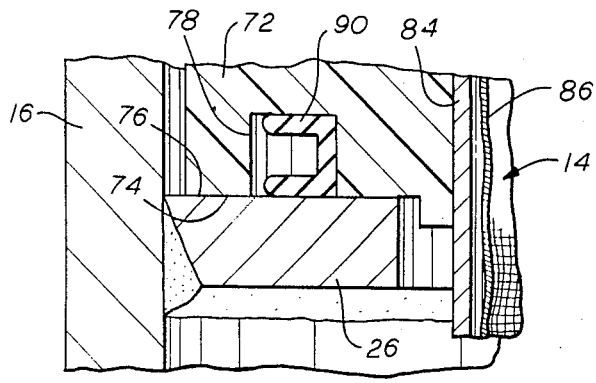
FIG. 4 is a sectional view showing the employment of a lip type seal ring as an alternate to the O-ring shown in FIG. 3.

In some situations the lip type seal 90 as shown in FIG. 4 may be considered better for a particular installation.

The twin vessel separator system 10 as shown in FIG. 1 may be used to increase total flow capacity. In this system, both of the filter bag assemblies 14 would likely be replaced at the same time while the system 10 is off the line. System 10 can also be equipped with appropriate block valves (not shown) whereby each of the separator vessels 12 can be isolated separately and a respective filter bag 13 can be changed without interruption of flow through the system.

Although only one overall embodiment of the invention is herein illustrated and described, it will be understood that this embodiment is exemplary and that various other embodiments can be made within the spirit and scope of the present invention, all as defined in the appended claims.

What is claimed is:

1. A filter system having a readily replaceable filter element, comprising:
    (a) an inlet conduit and outlet conduit respectively adapted for connection to flow control valves;
    (b) an elongated cylinder vessel body having a flow inlet connected to the inlet conduit, a flow outlet connected to the outlet conduit, a closed end, an open end, a fixed closure flange defined about the periphery of said open end, and a support flange defined about the inner wall of said body between said flow inlet and said flow outlet;
    (c) said support flange having a flat surface facing said slow inlet;
    (d) a moveable cover member having a movable closure flange adapted to fit said fixed closure flange;
    (e) hinge means connecting the cover member to said vessel body for pivoting said cover member from a closed position are to an open position;
    (f) said movable closure flange and said fixed closure flange respectively defining flat surfaces on one side and chamfered bevels on the other side to cooperatively form a V-shaped section in external profile when said flat surfaces are disposed in abutment;
    (g) one of said flat surfaces forming a peripheral groove containing a first seal ring to effect a fluid tight seal when said flat surfaces are constrained together;
    (h) a hinged constraining ring defining a V-shaped sectional internal profile about its inner periphery, said constraining ring being adapted to be cammed about said V-shaped external profile of said flanges and also adapted to be pivoted about its hinge from a closed to an open position;
    (i) a toggle latching means connecting to latch said constraining ring into a forceful camming relationship about said flanges when toggled to a closed position and into a position releasing said flanges when toggles to an open position;
    (j) an elongated liquid-solids filter element member disposed within said body, said filter element having an elongated hollow permeable member attached about the periphery of a support ring, said support ring having a flat surface abutting said flat surface of said support flange in sealing relationship;

(k) a peripheral groove formed in the flat surface of one of said support ring and said support flange and containing a second seal ring to effect further a fluid tight seal therebetween; and (l) a supporting arcuate resilient spring connected to opposite sides of said support ring and extending to be forcefully deformed against the inner side of said cover member when said cover member is in closed position to forcefully abutt said support ring against said support flange.

2. The system of claim 1 wherein each of said seal rings comprises an O-ring.

3. The system of claim 1 wherein each of said seal rings comprises a lip type seal ring.

4. The system of claim 1 wherein said hollow elongated permeable member comprises a cylindrical support flow screen enclosing and supporting a permeable flow filter means.

5. The system of claim 4 wherein said flow screen comprises perforated sheet metal.

6. The system of claim 4 wherein said flow screen comprises a woven wire material.

7. The system of claim 4 wherein said flow filter means comprises felted cloth.

8. The system of claim 4 wherein said flow filter means comprises wovencoth.

9. The system of claim 4 wherein said flow filter means comprises pleated material for greater surface area.

10. A filter system comprising:
(a) an inlet conduit and an outlet conduit adapted for respective connection to flow control valves;
(b) an elongated cylindrical vessel body having a flow inlet connected to said inlet conduit, a flow outlet connected to said outlet conduit, a closed end, an open end, a fixed closure flange formed about the periphery of said open end, and a support flange having a flat angular sealing surface formed around the inner wall of said body facing said flow inlet below said flow inlet and above said flow outlet;
(c) a moveable cover member having a moveable closure flange adapted to fit said fixed closure flange;
(d) hinge means connecting the cover member to said vessel body for pivoting said cover member from a closed position to an open position;
(e) toggle latching means connecting to latch said cover member into sealed relationship with said vessel body;
(f) an elongated liquid-solids separator element having an elongated hollow permeable member attached about the periphery of a support ring, said support ring having a flat annular sealing surface abutting the flat annular sealing surface of said support flange below said flow inlet;
(g) an arcuate resilient support spring rigidly connected to opposite sides of said support ring and extending upwardly from said annular sealing surfaces to be forcefully deformed against the inner side near the center of said cover member when said cover member is inclosed position; and
(h) said hollow elongated member comprising a cylindrical support flow screen enclosing and supporting a permeable flow filter means.

11. The combination of claim 10 to further including: a peripheral groove defined in a flat surface of one of said support ring and said support flange and containing an O-ring to effect further a fluid tight seal therebetween.

12. A filter system comprising:
(a) a cylindrical vessel body having (1) a flow inlet connected to an inlet conduit, (2) a flow outlet connected to an outlet conduit, (3) a closed end, (4) an open end, (5) a fixed closure flange formed about the periphery of said open end, (6) a support flange defined about the inner wall of said body between said inlet and said outlet and having a flat annular surface facing said inlet, and (7) a movable cover member haviing a movable closure flange adapted to fit said fixed closure flange;
(b) an elongated solids filter element member disposed within said body, said filter element having an elongated hollow permeable member attached about the periphery of a support ring, said support ring having a flat surface abutting said flat surface of said support flang in sealed relationship;
(c) a peripheral groove defined in an abutting flat surface of one of said support ring and said support flange and containing a seal ring to effect a fluid tight seal therebetween; and
(d) an arcuate resilient spring connected to opposite sides of said support ring and extending to be forcefully deformed against the inner side of said cover member when said cover member is in closed position and therby to create an initial sealing force of the flat surface of said support ring abutting aginst the flat surfce of said support flange;
(e) hinge means connecting said cover member to said vessel body for pivoting said cover member from a closed position to an open position;
(f) said fixed cosure flange and said moveable closure flange each defining flat surfaces on one side and chamfered bevels on the other side to cooperatively define a V-shaped section external profile when said flat surfaces are disposed in butment;
(g) one of said flat surfaces defining a peripheral groove containing a second seal ring to effect a fluid type seal when said flat surfaces are constrained together;
(h) a hinged constraining ring defining a V-shaped sectional internalprofile about its inner periphery which is adapted to be cammed about said V-shaped external profiel to constrain said flanges and to be pivoted from a closed to an open position; and
(i) a toggle latching means connecting to latch said constraining ring into a forceful camming relationship about said flanges when toggle to a closed positionand into a position releasing said flanges when toggled to an open position.

13. the combination of claim 12 wherein said hollow elongated permeable member comprises a cylindrical support flow screen enclosing and supporting a permeble flow filter means.

14. The combination of claim 7 wherein said flow filter means further includes a porous packing of particulate material.

15. The combination of claim 1 wherein said flow filter element member further includes a porous packing of particulate material.

* * * * *